(12) United States Patent
Kikuchi

(10) Patent No.: US 6,559,892 B1
(45) Date of Patent: May 6, 2003

(54) VIDEO SIGNAL TRANSMITTER

(75) Inventor: Hidekazu Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/529,079

(22) PCT Filed: Oct. 9, 1998

(86) PCT No.: PCT/JP98/04559
§ 371 (c)(1),
(2), (4) Date: Apr. 7, 2000

(87) PCT Pub. No.: WO99/20055
PCT Pub. Date: Apr. 22, 1999

(30) Foreign Application Priority Data

Oct. 9, 1997 (JP) ............................................. 9-277100

(51) Int. Cl.$^7$ .......................... H04N 11/06; H04N 11/22
(52) U.S. Cl. ...................... 348/536; 348/488; 348/537; 348/540; 370/366; 375/327
(58) Field of Search ................................ 348/488, 536, 348/537, 540, 470, 469, 524, 533, 608; 375/358, 362, 327, 376, 371; 370/366, 503, 516, 278, 282, 535; 345/213; 341/100, 101

(56) References Cited

U.S. PATENT DOCUMENTS

| | | | | |
|---|---|---|---|---|
| 5,598,156 A | * | 1/1997 | Hush et al. .................. | 341/100 |
| 5,721,755 A | * | 2/1998 | Kim et al. .................. | 348/547 |
| 5,790,058 A | * | 8/1998 | Burzio et al. ............... | 341/100 |
| 5,808,571 A | * | 9/1998 | Kuwata et al. .............. | 341/100 |
| 5,818,365 A | * | 10/1998 | Hush et al. .................. | 341/100 |
| 6,018,305 A | * | 1/2000 | Kikuchi et al. .............. | 341/100 |
| 6,069,927 A | * | 5/2000 | Kikuchi ....................... | 370/503 |
| 6,266,383 B1 | * | 7/2001 | Kikuchi ....................... | 370/503 |
| 6,300,982 B1 | * | 10/2001 | Koh ............................ | 345/213 |
| 6,452,591 B1 | * | 9/2002 | Ho et al. ...................... | 326/38 |

FOREIGN PATENT DOCUMENTS

| | | |
|---|---|---|
| JP | 62-232558 | 10/1987 |
| JP | 64-77287 A | 3/1989 |
| JP | 61-67090 A | 6/1994 |

* cited by examiner

*Primary Examiner*—John Miller
*Assistant Examiner*—Jean W. Désir
(74) *Attorney, Agent, or Firm*—Ronald P. Kananen; Rader, Fishman & Grauer PLLC

(57) ABSTRACT

To provide a video signal transmission apparatus capable of correctly transmitting a digital video signal. A PLL circuit 5 has a first cutoff frequency lower than the frequency of a horizontal synchronization signal contained in a digital video signal S9. has the characteristics of causing attenuation of a signal of the frequency higher than the first cutoff frequency, performs PLL processing for a dot clock signal S14 for identifying one pixel's worth of data of the digital video signal S9, and generates a transmission clock signal 55 of the frequency N (integer of 2 or more) times the first dot clock signal S14. The PLLL circuit 6 has a second cutoff frequency higher than the frequency of the horizontal synchronization signal, tracks a signal of a frequency lower than the related second cutoff frequency, performs the PLL processing on the serial signal S2 input via the transmission cable 4, and generates a transmission clock signal S6.

13 Claims, 3 Drawing Sheets

VIDEO SIGNAL TRANSMITTER

TECHNICAL FIELD

The present invention relates to a video signal transmission apparatus for transmitting a multi-bit, digital, video signal converted to a serial signal.

BACKGROUND ART

For example, the technique of converting a multi-bit, digital, video signal into a serial signal and transmitting the same has been used in the trunk communications, LAN (Local Area Network), etc.

When transmitting a digital signal in this way, the transmitter multiplies the synchronization signal contained in a multi-bit digital signal, that is, the clock signal, to generate a clock signal for transmission of serial signal and multiplexes the multi-bit digital signal to generate a serial signal.

Further, the receiver uses a clock signal extracted from a frequency component contained in the received serial signals using a PLL (Phase Locked Loop) circuit so as to demultiplex the serial signal.

Here, the clock signal for transmission of the serial signal has a considerably high frequency compared with the clock signal of the multi-bit digital signal. For this reason, in order to reduce the transmission error, it is necessary to use a transmission clock signal of a low jitter having a high tire precision.

Accordingly for the transmitter, for example, a low jitter high precision clock signal output from a crystal oscillator is used as the clock signal of the multi-bit digital signal serving as the base for generating the transmission clock.

A liquid crystal display or other display receiving as its input a digital signal, however, sometimes is serially sent an R, G, and B multi-bit digital video signal.

Such a digital video signal is comprised by a 12– to 24-bit digital signal indicating a color gradation and SYNC (synchronization) signal indicating a synchronization position of an image. These digital signal and SYNC signal are synchronous with a dot clock signal. The color gradation of one pixel, an element comprising the image, is indicted for every dot clock signal.

Here, the frequency of the dot clock signal is set to about 25 to 70 MHz in accordance with the total number of pixels of the image.

The above-mentioned digital video signal is generally generated by a large-sized LSI (large scale integrated circuit) referred to as a graphic accelerator. The dot clock signal generated by the graphic accelerator contains a phase modulation component in addition to a pure synchronization clock component for the following reasons (1) and (2).

(1) In the graphic accelerator, the clock signal from the crystal oscillator is transformed in frequency by the PLL circuit, but an unnecessary and harmful signal component, that is, spurious noise, leaks out of this PLL circuit. This spurious noise appears as the phase modulation component of the dot clock signal.

(2) The noise accompanying a large volume of digital signal processing handled by the graphic accelerator leaks to the dot clock. For example, in the transmission of a R, G, and B digital video signal, the period for transmitting the data to be actually displayed as the image and a blanking period for not performing the image display are repeated with a cycle of the horizontal synchronization signal. For this reason, a strong phase modulation comprised of the frequency of the horizontal synchronization signal as a component is contained in the dot clock signal.

For this reason, the dot clock signal, the phase modulation component is mainly distributed at positions of a fraction to a multiple of the frequency of the horizontal synchronization signal.

However, there is a problem that if such a phase modulation component is contained in the dot clock signal, an obstacle occurs in the serial transmission of the digital video signal and the digital video signals cannot be correctly transmitted.

DISCLOSURE OF THE INVENTION

An object of the present invention is to provide a video signal transmission apparatus capable of suppressing the influence exerted upon the transmission clock signal by strong phase modulation having mainly the frequency of the horizontal synchronization signal as its component and, thereby, correctly transmitting the digital video signal.

The video signal transmission apparatus according to a first aspect of the present invention comprises a first PLL circuit having a first cutoff frequency lower than a frequency of a horizontal synchronization signal contained in a digital video signal, having the characteristics of causing attenuation of a phase modulation component of a frequency higher than the first cutoff frequency, and generating a first transmission clock signal of a frequency of N (integer of 2 or more) times a first dot clock signal for identifying one pixel's worth of data of the digital video signal and phase locked looped to the first dot clock signal; a first conversion means for generating a serial signal from a plurality of a parallel input element signals comprising the digital video signal based on the first dot clock signal and the first transmission clock signal; a transmission channel for transmitting the serial signal; a second PLL circuit having a second cutoff frequency higher than the frequency of the horizontal synchronization signal, tracking the phase modulation of a frequency lower than the second cutoff frequency, and generating a second transmission clock signal from the serial signal input via the transmission channel; a frequency division circuit for dividing the second transmission clock signal 1/N to generate a second dot clock signal; and, a second conversion means for generating a plurality of element signals to be output in parallel form a serial signal input though the transmission channel based on the second dot clock signal and the second transmission clock signal.

Preferably, the fist PLL circuit attenuates a phase modulation component contained in the first dot clock signal more than higher the frequency in a frequency region higher than the first cutoff frequency.

More preferably, the second PLL circuit has less of a tracking error the lower the frequency in a frequency region lower than the second cutoff frequency.

Further, the plurality of element signals are digital color signals and a synchronization signal Further, preferably, N is 4, 18, 24, 28, 30, or 32.

Further, according to a second aspect of the present invention, there is provided a video signal transmission apparatus for generating and transmitting a serial signal from a plurality of parallel input element signals comprising a digital video signal, comprising a PLL circuit having a cutoff frequency lower than a frequency of a horizontal synchronization signal contained in the digital video signal, having the characteristic of causing attenuation of a phase modulation component of a frequency higher than the cutoff frequency, and generating a transmission clock signal of a frequency of N (integer of 2 or more) times a dot clock signal for identifying one pixel's worth of data of the digital video signal and phase locked looped to the dot clock signal and a conversion means for generating a serial signal from a plurality of parallel input elements signals comprising the digital video signal based on the dot clock signal and the transmission clock signal.

Preferably, the PLLC circuit attenuates a phase modulation component contained in the dot clock signal more than the higher the frequency in a frequency region higher then the cutoff frequency.

BRIEF DESCRIPTION OF THE DRAWINGS

The above object and features of the present invention will become clearer form the following description given with reference to the appended drawings.

BEST MODE FOR WORKING THE INVENTION

Below, an embodiment of a digital video signal transmission apparatus according to the present invention will be explained.

Figure 1:
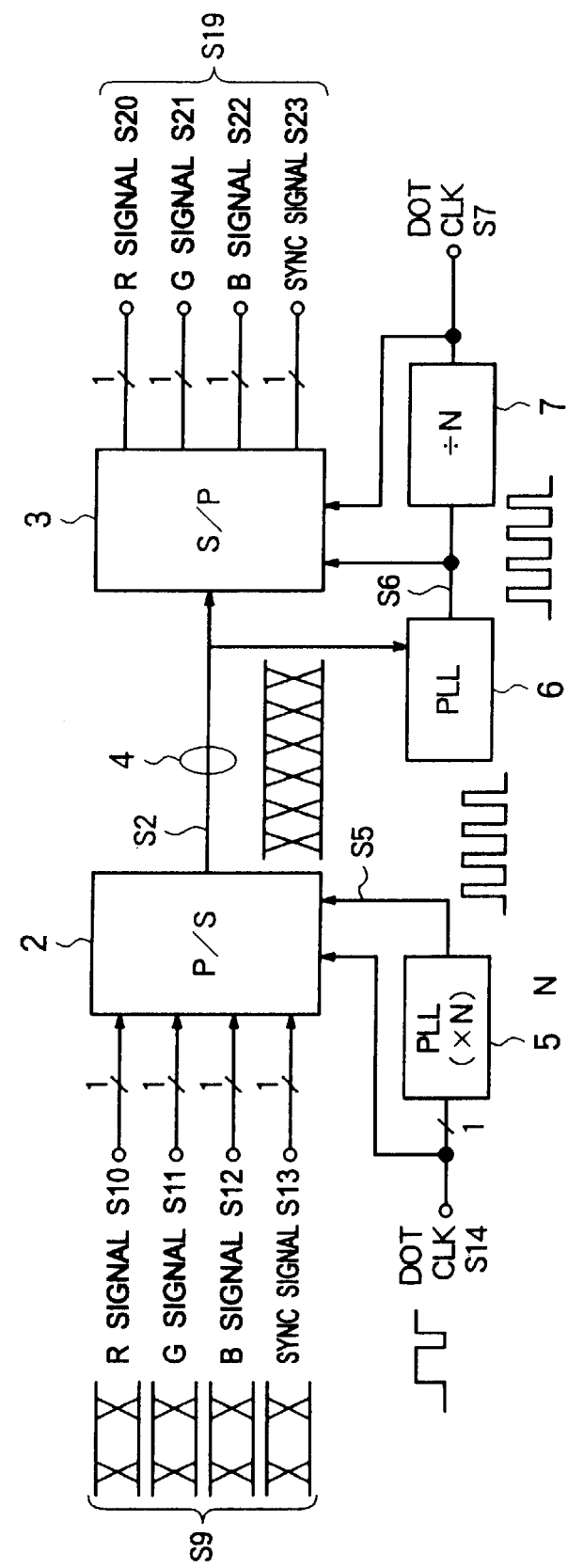
FIG. 1 is a view of the system configuration of an embodiment of a digital, video signal transmission apparatus according to the present invention.

FIG. 1 is a view of the system configuration of an embodiment of a digital video signal transmission apparatus 1 according to the present invention.

As shown in FIG. 1, the digital video signal transmission apparatus 1 has, for example, a parallel/serial (P/S/) converter 2, a serial/parallel (S/P) converter 3, and transmission cable 4, a PLL Circuit 5, a PLL circuit 6, and a frequency divider 7.

Here, the parallel!serial converter 2 and the PLL circuit 5 are built in a transmitter arranged at one end of the transmission cable 4. Also, the serial/parallel converter 3. PLL circuit 6, and frequency divider 7 are built in a receiver arranged at the other end of the transmission cable 4.

The PLL circuit 5 generates a transmission clock signal S5 having a frequency of a dot clock (DOTCLK) signal S14 by N in synchronization with that frequency. In the present embodiment, N is 4.

Note that, as N, other than 4 18, 24, 28, 30, or 32 can be used too.

Also, the PLL circuit 5 has, for example, a cutoff frequency $BWP_1$, which is $1/10^{th}$ or less of the frequency $f_{HSYNC}$ of the horizontal synchronization signal of a digital video signal S9 and attenuates the phase modulation component of the frequency exceeding the cutoff frequency $BWP_1$ contained in a dot clock signal S14. Here, in the PLL circuit 5, at a frequency exceeding the cutoff frequency BWP1, the higher the frequency, the larger the attenuation of the transmission clock signal 55 with respect to the dot clock signal S14.

When the PLL circuit 5 has a secondary transmission function characteristic, the ratio of the phase of the output signal with respect to the phase of the input signal, that is, the jitter $H_T(s)$, is indicated by the following equation (1)

$$H_T(s) = (s)/\Theta_o(s)/\Theta_i(s) \qquad (1)$$
$$= (2\zeta \cdot \omega_n \cdot s + \omega_n^2)/(s^2 + 2\zeta \cdot \omega_n \cdot s + \omega_n^2) \ldots$$

In equation (1), $\Theta_o(s)$ indicates a Laplace transform of the phase of the output signal, and $\Theta_o(S)$ indicated the Laplace transforms of the phase of the input signal. Also, $\zeta$ indicates a damping coefficient, and $\omega_n$ indicates a natural angular frequency.

Here, in the PLL circuit 5, a cutoff frequency $BWP_1$ (Band Width Point) at which the jitter transfer $H_T(s)$ becomes −3 dB is indicated by the following equation (2).

$$BWP_1 = \omega_n \cdot [1+2\zeta^2+\{1+(1+2\zeta^2)^2\}^{1/2}]^{1/2}$$

In the PLL circuit 5, the cutoff frequency $BWP_1$ is set to $1/10$ times or less of the frequency $f_{HSYNC}$ of the horizontal synchronization signal, as mention above.

By setting the cutoff frequency $BWP_1$ to $1/10$ times or less the frequency $f_{HSYNC}$ of the horizontal synchronization signal in this way, the phase modulation component of the jitter having the frequency in the vicinity of the frequency $f_{HSYNC}$ of the horizontal synchronization signal contained in the dot clock signal S14 can not pass much at all through the PLL circuit 5. Namely, the jitter occurring in the serial signal S4 generated based on the dot clock signal S14 can be suppressed.

Note that the dot clock signal S14 is used when indicating the punctuation of the data of the color gradation of a pixel of the image indicated by the digital video signal and is set so as to have a frequency of about 25 to 70 MHz in accordance with the total number of pixels of the image.

The parallel/serial converter 2 receives as its input a digital P signal S10, a digital G signal S11, a digital B signal S 12, and a SYNC (synchronization) signal S13 compromising the digital video signal S9, performs parallel/serial conversion on these signals based on the transmission clock signal S5 input from the PLL circuit 5 and the dot clock signal S14, and generates the serial signal S2. The parallel/serial converter 2 outputs the generated serial signal S2 to the serial/parallel converter 3 via the transmission cable 4.

The transmission cable 4 is a monitor cable using, for example, copper wire and has a length of, for example, about 0.1 to 20 m.

The PLL circuit 6 tracks the frequency of the serial signal S2 received by the receiver via the transmission cable 4 and extracts a transmission clock signal S6. The PBS circuit 6 outputs the extracted transmission clock signal S6 to the serial/parallel converter 3 and the frequency divider 7.

Also, the PLL circuit 6 has, for example, a cutoff frequency $BWP_2$ of 10 times or more of the frequency $f_{HSYNC}$ Of the horizontal synchronization signal of the digital video signal S9 and tracks the phase modulation component of a frequency of less than the cutoff frequency $BWP_2$ contained in the serial signal S2.

Here, at below the frequency of the cutoff frequency $BWP_2$ the lower the frequency, the smaller the tracking error (the better the tracking).

Namely, the PLL. circuit 6 correctly tracks the serial signal S2 having the phase modulation and prevents error from occurring.

Figure 2:
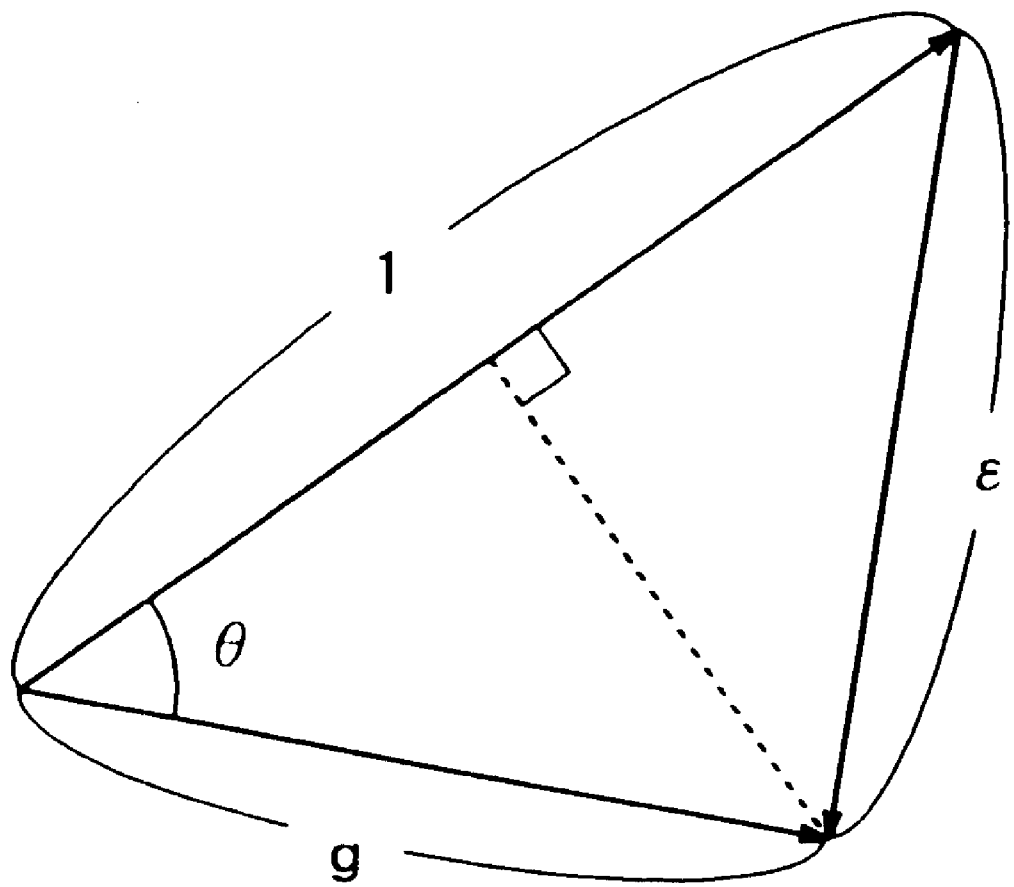
FIG. 2 is a view for explaining the relationships among a phase modulation of an input signal, a modulation component g appearing in an output signal, and a relative ratio ϵ of the tracking error with respect to the phase modulation of the input signal.

FIG. 2 is a view for explaining the relationship among a phase modulation of the input signal, a modulation component g appearing in the output signal, and a relative ratio ω of the tracking error with respect to the phase modulation of the input signal.

As shown in FIG. 2, the relative error ε of the tracking error with respect to the phase modulation of the input signal is indicated by the following equation (3) when considering the phase modulation as a phaser of a magnitude 1.

Here, a "phaser" is an indicator representing the amplitude and phase of a sine-wave signal.

$$\epsilon(\omega) = \{(1-g\cos\Theta)^2 + (g\sin\Theta)^2\}^{1/2}$$

Note that, g and, in Equation (3) are indicated by following equations (4) and (5).

$$g = |H_r(\omega)| \quad (4)$$

$$\Theta = <|H_r(\omega)| \quad (5)$$

In the PLL circuit 6, the lower the frequency of the serial signal S2, the more the angle Θ approaches 0, the more the length of the modulation component g appearing in the output signal approaches 1, and the more ε approaches 0. Namely, the output signal tracks the input signal well. On the other hand, the higher the frequency of the serial signal S2, the larger the angle Θ, the more the modulation component g appearing in the output signal approaches 0, and the more ε approaches 1. Namely, the tracking error is large, and the output signal substantially does not track the input signal.

The PLL circuit 6 sets the cutoff frequency BWP, found from Equation (2) in the same way as the cutoff frequency $BWP_1$ to 10 times or more the frequency $f_{HSYNC}$ of the horizontal synchronization signal, unlike the PLL, circuit 5.

By setting the cutoff frequency $BWP_2$ to 10 times or more the frequency $f_{HSYNC}$ of the horizontal synchronization signal in this way, it is possible to get the large-phase modulation component contained in the serial signal S2 to remain at the transmission clock signal S6 and to suppress the tracking error of the transmission clock signal S6 with respect to the serial signal S2. Namely, occurrence of error at the time of transmission can be suppressed.

The frequency divider 7 generates a dot clock (DOTCLK) signal S7 obtained by dividing the frequency of the transmission clock signal S6 by N times and outputs this to the serial/parallel converter 3.

The serial/parallel converter 3 performs serial/parallel conversion on the serial signal S4 received via the transmission cable 4 based on the transmission clock signal S6 and the dot clock signal S7 and outputs a digital R signal S20, a digital G signal S21, a digital B signal S22, and a SYNC (synchronization) signal S23 comprising a digital video signal S19; in parallel.

Below, an explanation will be made of the operation of the digital, video signal, transmission apparatus 1 by giving a concrete example.

Figure 3A:
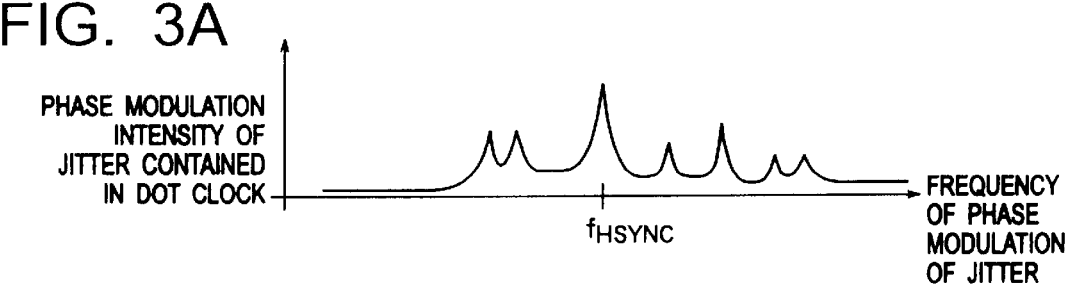
FIG. 3A is a view showing the relationships between the frequency and the intensity of the phase modulation of a litter of a dot clock.
Figure 3B:
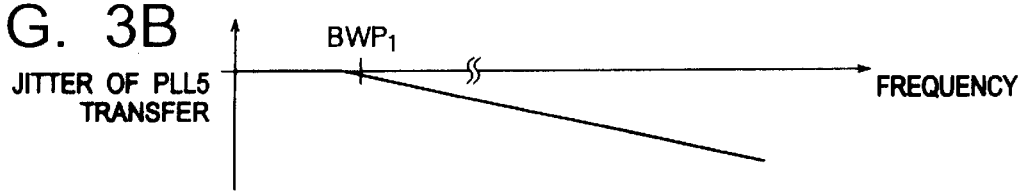
FIG. 3B is a view showing the relationships between the jitter transfer and the frequency of a PLL circuit of a transmitter.
Figure 3C:
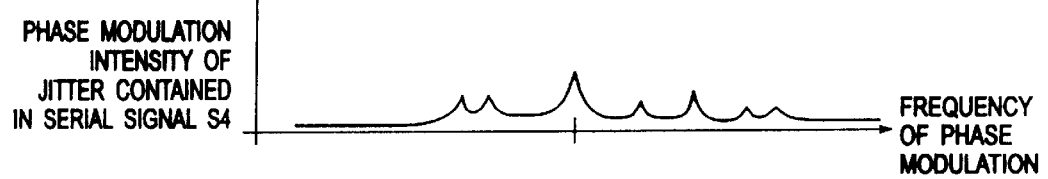
FIG. 3C is a view showing the relationship between the phase modulation intensity and the frequency of the jitter contained in a serial signal.
Figure 3D:
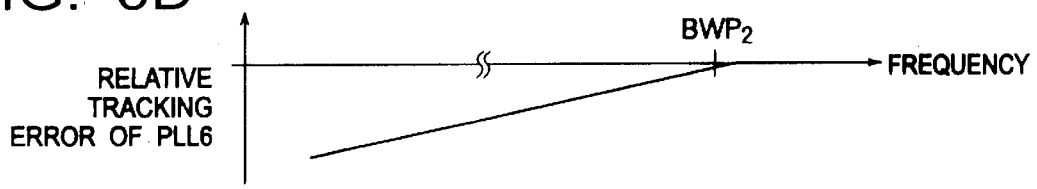
FIG. 3D is a view showing the relationship between a relative tracking error and the frequency of a PLL circuit of a receiver.
Figure 3E:
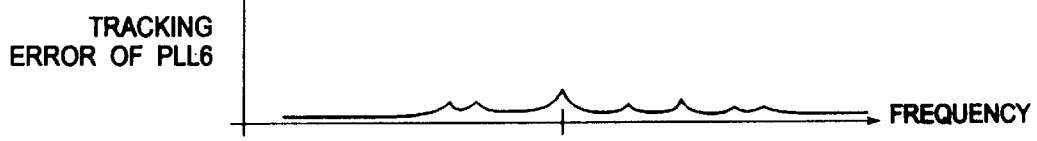
FIG. 3E is a view showing the relationship between the tracking error and the frequency of the PLL circuit of the receiver.

FIG. 3A is a view showing the relationship between the frequency and the intensity of the phase modulation of the jitter of the dot clock S14; FIG. 3B is a view showing the relationship between the litter transfer and the frequency of the PLL circuit 5; FIG. 3C is a view showing the relationship between the phase modulation intensity and the frequency of the jitter contained in the serial signal S4; FIG. 3D is a view showing the relationship between the relative tracking error and the frequency of the PLLC circuit 6; and FIG. 3E is a view showing the relationship between the tracking error and the frequency of the PLL circuit 6.

In the digital video signal transmission apparatus 1, first, the dot clock signal S14 having the modulation intensity of the litter as shown in FIG. 3A is input to the PLL circuit 5 shown in FIG. 1.

Here, the PLL circuit 5 has LPF (low pass filter) characteristics as shown in FIG. 3B and, in addition, sets the cutoff frequency $BWP_1$ to 10 times or less of the frequency $f_{HSYNC}$ of the horizontal synchronization signal; therefore, the large amount of jitter near the frequency $f_{HSYNC}$ of the horizontal synchronization signal contained in the dot clock signal S14 show in FIG. 3A is greatly attenuated, and a transmission clock signal S5 obtained by multiplying the dot clock signal S14 in which the jitter was attenuated by N is generated.

This transmission clock signal S5 is output to the parallel/serial converter 2.

Then, in the parallel/serial converter 2, the digital R signal S10, the digital G signal S11, the digital B signal S 12, and the SYNC (synchronization) signal S13 comprising the digital video signal S9 are input in parallel. These signals are subjected to parallel/serial conversion based on the transmission clock signal S5 and the dot clock signal S14 to generate the serial signal S2. At this time, since a transmission clock signal S6 in which the jitter contained in the serial signal S2 is improved as shown in FIG. 3C.

Then, the serial signal S2 is transmitted to the serial/parallel converter 3 and the PLL circuit 6 via the transmission cable 4.

Then, in the PLL circuit 6, the transmission clock signal S6 is extracted by tracking the transmission clock signal contained in the serial signal S2, This transmission clock signal S6 is output to the serial/parallel converter 3 and the frequency divider 7.

At this time, since the PLL circuit 6 has, for example, a cutoff frequency $BWP_2$ to 10 times or more the frequency $f_{HSYNC}$ of the horizontal synchronization signal of the video signal 9, as mentioned above as shown in FIGS. 3D and 3E, the transmission clock signal S6 tracks the phase modulation of the transmission clock signal contained in the serial signals very well. For this reason, the occurrence of transmission error is suppressed.

The transmission clock signal 86 is divided in frequency by N at the frequency divider 7, and the dot clock signal S7 is generated. The dot clock signal S7 is output to the serial/parallel converter 3.

Then, in the serial/parallel converter 3, the serial signal 84 received via the transmission cable 4 is converted from serial to parallel based on the transmission clock signal S6 and the dot clock signal S7, and the digital R signal S20, the digital G signal S21, the digital B signal S22, and the SYNC (synchronized) signal S23 comprising the digital video signal S19 are output in parallel.

The present invention is not limited to the above embodiment.

For example, in the embodiment, as the phase modulation intensity of the jitter contained in the dot clock signal S14, the case shown in FIG. 3A was exemplified, but the effect can be similarly exhibited in cases other than this was well.

Also, the above embodiment, the cutoff frequency $BWP_1$ of the PLL circuit 5 was set 1/10 times or less of the frequency $f_{HSYNC}$ of the horizontal synchronization signal, the cutoff frequency $BWP_1$ can be another frequency too, so far as it is lower than the frequency $f_{HSYNC}$.

Further, in the above embodiment, the cutoff frequency $BWP_2$ of the PLL circuit 6 was set to 10 times the frequency $f_{HSYNC}$ of the horizontal synchronization signal, but the cutoff frequency $BWP_2$ can be another frequency too so far as it is higher than the frequency $f_{HSYNC}$.

As explained above, according to the video signal transmission apparatus of the present invention, the effect of the strong phase modulation having a frequency in this vicinity of the frequency of the horizontal synchronized signal is suppressed, and thus the digital video signal can be correctly transmitted.

INDUSTRIAL APPLICABILITY

The video signal transmission apparatus of the present invention can be used when transmitting a multi-bit, digital, video signal serially to a liquid crystal display or other display which receives as input a digital signal.

What is claimed is:

1. A video signal transmission apparatus, comprising:
a first PLL circuit having a first cutoff frequency lower than a frequency of a horizontal synchronization signal contained in a digital video signal, having the characteristic of causing attenuation of a phase modulation component of a frequency higher than the first cutoff frequency, and generating a first transmission clock signal of a frequency of N (integer of 2 or more) times a first dot clock signal for identifying one pixel's worth of data of the digital video signal and phase locked looped to the first dot clock signal;
a first conversion means for generating a serial signal from a plurality of parallel input element signals comprising the digital video signal based on the first dot clock signal and the first transmission clock signal;
a transmission channel for transmitting the serial signal;
a second PLL circuit having a second cutoff frequency higher than the frequency of the horizontal synchronization signal, tracking a phase modulation of a frequency lower than the second cutoff frequency, and generating a second transmission clock signal from said serial signal input via the transmission channel;
a frequency division circuit for dividing the second transmission clock signal to 1/N to generate a second dot clock signal; and
a second conversion means for generating a plurality of element signals to be output in parallel from a serial signal input through the transmission channel based on the second dot clock signal and the second transmission clock signal.

2. A video signal transmission apparatus as set forth in claim 1, wherein the first PLL circuit attenuates a phase modulation component contained in the first dot clock signal more the higher the frequency in a frequency region higher than the first cutoff frequency.

3. A video signal transmission apparatus as set forth in claim 1, wherein the second PLL circuit has less of a tracking error the lower the frequency in a frequency region lower than the second cutoff frequency.

4. A video signal transmission apparatus as set forth in claim 2, wherein the second PLL circuit has less of a tracking error the lower the frequency in a frequency region lower than the second cutoff frequency.

5. A video signal transmission apparatus as set forth in claim 1, wherein the plurality of element signals are digital color signals and a synchronization signal.

6. A video signal transmission apparatus as set forth in claim 1, wherein said N is 4, 18, 24, 28, 30, or 32.

7. A video signal transmission apparatus as set forth in claim 1, wherein the transmission channel is a cable.

8. A video signal transmission apparatus for generating and transmitting a serial signal from a plurality of parallel input element signals comprising a digital video signal, comprising:
a PLL circuit having a cutoff frequency lower than a frequency of a horizontal synchronization signal contained in the digital video signal, having the characteristic of causing attenuation of a phase modulation component of a frequency higher than the cutoff frequency, and generating a transmission clock signal of a frequency of N (integer of 2 or more) times a dot clock signal for identifying one pixel's worth of data of the digital video signal and phase locked looped to the dot clock signal and
a conversion means for generating a serial signal from a plurality of parallel input element signals comprising the digital video signal based on the dot clock signal and the transmission clock signal.

9. A video signal transmission apparatus as set forth in claim 8, wherein the PLL circuit attenuates a phase modulation component contained in the dot clock signal more the higher the frequency in a frequency region higher than the cutoff frequency.

10. A video signal transmission apparatus as set forth in claim 8, wherein the plurality of element signals are digital color signals and a synchronization signal.

11. A video signal transmission apparatus for receiving a serial signal generated from a plurality of parallel input element signals comprising a digital video signal through a transmission channel based on a first transmission clock signal phase locked looped to a first dot clock signal, attenuated in phase modulation component of a frequency higher than a first cutoff frequency lower than a frequency of a horizontal synchronization signal contained in the digital video signal, identifying one pixel's worth of data of a digital video signal and having a frequency of N (an integer of 2 or more) times a first dot clock signal and on said first dot signal, comprising:
a PLL circuit having a second cutoff frequency higher than the frequency of the horizontal synchronization signal, tracking phase modulation of a frequency lower than the second cutoff frequency, and generating a second transmission clock signal from said serial signal input through the transmission channel,
a frequency division circuit for dividing the second transmission clock signal to 1/N to generate a second dot clock signal, and
a conversion means for generating a plurality of parallel output element signals from a serial signal input through said transmission channel based on said second dot clock signal and said second transmission clock signal.

12. A video signal transmission apparatus as set forth in claim 11, wherein the PLL circuit has less of a tracking error the lower the frequency in a frequency region lower than the second cutoff frequency.

13. A video signal transmission apparatus as set forth in claim 11, wherein said plurality of element signals are digital color signals and a synchronization signal.

* * * * *

UNITED STATES PATENT AND TRADEMARK OFFICE
CERTIFICATE OF CORRECTION

PATENT NO. : 6,559,892 B1
DATED : May 6, 2003
INVENTOR(S) : Hidekazu Kikuchi

It is certified that error appears in the above-identified patent and that said Letters Patent is hereby corrected as shown below:

<u>Title page,</u>
Item [57], ABSTRACT,
Line 9, replace "55" with -- S5 --
Line 11, replace "PLLL" with -- PLL --.

Signed and Sealed this

Fourteenth Day of October, 2003

JAMES E. ROGAN
*Director of the United States Patent and Trademark Office*